(12) United States Patent
Kim et al.

(10) Patent No.: US 12,263,885 B2
(45) Date of Patent: Apr. 1, 2025

(54) UPPER BODY FOR VEHICLE

(71) Applicants: Hyundai Motor Company, Seoul (KR); Kia Corporation, Seoul (KR)

(72) Inventors: Ho Yeon Kim, Daegu (KR); Seok Ju Gim, Seongnam-si (KR); Won Oh Kim, Ansan-si (KR); Je Joon Lee, Hwaseong-si (KR); Chul Hee Heo, Hwaseong-si (KR); Ji Ae Yong, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 365 days.

(21) Appl. No.: 17/868,175

(22) Filed: Jul. 19, 2022

(65) Prior Publication Data
US 2023/0182818 A1 Jun. 15, 2023

(30) Foreign Application Priority Data
Dec. 15, 2021 (KR) .................. 10-2021-0179807

(51) Int. Cl.
*B62D 25/04* (2006.01)
*B62D 21/02* (2006.01)
*B62D 21/15* (2006.01)

(52) U.S. Cl.
CPC .......... *B62D 21/152* (2013.01); *B62D 21/02* (2013.01); *B62D 21/157* (2013.01); *B62D 25/04* (2013.01)

(58) Field of Classification Search
CPC .... B62D 25/00; B62D 27/023; B62D 27/065; B62D 27/02; B62D 23/005; B62D 25/04;
(Continued)

(56) References Cited

U.S. PATENT DOCUMENTS

| | | | | |
|---|---|---|---|---|
| 1,673,786 A | * | 6/1928 | Warhus | B62D 25/00 |
| | | | | 296/178 |
| 1,868,263 A | * | 7/1932 | Weymann | B62D 29/02 |
| | | | | 296/203.01 |

(Continued)

FOREIGN PATENT DOCUMENTS

| | | | | |
|---|---|---|---|---|
| CN | 112429116 A | * | 3/2021 | ........... B62D 63/025 |
| CN | 213768359 U | * | 7/2021 | |

(Continued)

OTHER PUBLICATIONS

KR-20210071182-A translated (Year: 2021).*
(Continued)

*Primary Examiner* — Amy R Weisberg
*Assistant Examiner* — Whitney Nicole Francis
(74) *Attorney, Agent, or Firm* — SLATER MATSIL, LLP

(57) ABSTRACT

An embodiment upper body for a vehicle includes an upper main body extending in a longitudinal direction from two opposite sides of the vehicle, the upper main body comprising a plurality of transverse members, a plurality of upper body pillar units each comprising a central portion bent and protruding upward and two opposite ends respectively connected to two opposite sides of the upper main body, the plurality of upper body pillar units being disposed to be spaced apart from one another in the longitudinal direction, and an upper body connection member extending in the longitudinal direction of the vehicle, spaced apart upward from a side of the upper main body, and connecting sides of the plurality of upper body pillar units.

18 Claims, 14 Drawing Sheets

(58) Field of Classification Search
CPC ... B62D 33/044; B62D 25/2036; B62D 31/02
USPC .................... 296/193.06, 205, 178, 203.1
See application file for complete search history.

(56) References Cited

U.S. PATENT DOCUMENTS

| | | | | |
|---|---|---|---|---|
| 2,059,866 | A * | 11/1936 | Hicks | B62D 31/02 105/249 |
| 2,119,655 | A * | 6/1938 | Stout | B62D 31/02 D12/84 |
| 2,239,089 | A * | 4/1941 | Fageol | B62D 31/02 296/203.01 |
| 2,849,254 | A * | 8/1958 | Martinus | B62D 31/02 296/178 |
| 3,881,765 | A * | 5/1975 | Cerra | B62D 31/02 52/48 |
| 4,773,701 | A * | 9/1988 | Messori | F16B 9/058 296/29 |
| 5,577,793 | A * | 11/1996 | Kobasic | B62D 31/02 296/146.12 |
| 8,056,958 | B2 * | 11/2011 | Oriet | B60R 21/13 296/178 |
| 2023/0174161 | A1 | 6/2023 | Kim et al. | |

FOREIGN PATENT DOCUMENTS

| | | | | |
|---|---|---|---|---|
| CN | 214215576 U | * | 9/2021 | ........... B62D 63/025 |
| EP | 3470312 A1 | * | 4/2019 | ............. B62D 31/02 |
| KR | 20210071182 A | * | 6/2021 | |
| KR | 20210083533 A | | 7/2021 | |
| KR | 20230083001 A | | 6/2023 | |

OTHER PUBLICATIONS

CN-112429116-A translation (Year: 2021).*
CN-214215576-U translation (Year: 2021).*
CN-213768359-U translation (Year: 2021).*

* cited by examiner though for a UPPER BODY FOR VEHICLE

CROSS-REFERENCE TO RELATED APPLICATIONS

This application claims the benefit of Korean Patent Application No. 10-2021-0179807, filed on Dec. 15, 2021, which application is hereby incorporated herein by reference.

TECHNICAL FIELD

The present invention relates to an upper body for a vehicle.

BACKGROUND

A general structure of a vehicle body is manufactured by machining and welding components through a pressing process using molds. For this reason, there is a problem in that a massive amount of investment is required for facilities such as pressing factories, vehicle body welding factories, and painting factories and a design degree of freedom is low.

In particular, in the case of the vehicle body in the related art, a large number of changes in design are required to manufacture a small number of products of various types. For this reason, there is a problem in that the number of molds is rapidly increased, which inevitably increases production costs.

Recently, it is necessary to simplify a process of manufacturing a vehicle and minimize a development period to meet customer needs and cope with quickly changing market environments in a timely manner.

Therefore, there is a need for a vehicle body structure capable of improving assembly properties of a vehicle body in a smart factory environment while coping with various types of designs.

In addition, recently, with the development of autonomous driving technologies, there is a need for a vehicle capable of transporting freight without requiring a driver to drive the vehicle. To reduce costs required to manufacture an autonomous vehicle in which the driver is not seated and to simplify a process of manufacturing the autonomous vehicle, there is a need for a vehicle capable of being manufactured in an environmentally friendly smart factory in which some components are modularized, and a vehicle body is assembled by mechanically assembling the modularized components of the vehicle by bolting or the like without requiring a pressing process, a vehicle body welding process, and a painting process.

The foregoing explained as the background is intended merely to aid in the understanding of the background of the present invention, and is not intended to mean that the present invention falls within the purview of the related art that is already known to those skilled in the art.

SUMMARY

The present invention relates to an upper body for a vehicle. Particular embodiments relate to a technology related to a vehicle body structure of a vehicle that operates for the purpose of freight delivery, portable marketing, and the like. Further particular embodiments relate to a technology related to a vehicle body frame structure used to simplify a process of manufacturing a vehicle.

Embodiments of the present invention can solve problems in the art and provide a vehicle simply assembled by manufacturing an upper body for a vehicle by coupling a plurality of pipes by bolting.

An upper body for a vehicle according to embodiments of the present invention is configured by a plurality of pipes, has a lower portion to which a lower body is assembled, and includes an upper main body extending in a longitudinal direction from two opposite sides of the vehicle, having a plurality of transverse members, and having a lower portion to which the lower body is coupled, a plurality of upper body pillar units each having a central portion bent and protruding upward, having two opposite ends respectively connected to two opposite sides of the upper main body, and disposed to be spaced apart from one another in the longitudinal direction, and an upper body connection member extending in the longitudinal direction of the vehicle, spaced apart upward from a side of the upper main body, and configured to connect sides of the plurality of upper body pillar units.

The upper main body may include a pair of upper body longitudinal members extending in the longitudinal direction and a plurality of upper body transverse members configured to connect the pair of upper body longitudinal members in a transverse direction and spaced apart from one another in the longitudinal direction.

The upper main body may further include upper body brackets coupled to the upper body longitudinal members and configured to connect the upper body longitudinal members and the upper body transverse members.

The upper body transverse members may be bent and extend so as to be coupled to an interior material or an exterior material of the vehicle.

The upper main body may further include upper body bent members each coupled to an outer side of the upper body transverse member positioned at a front or rear side of the vehicle and bent and protruding outward so as to be coupled to the exterior material of the vehicle.

The upper body pillar units may be disposed to be symmetric in a forward/rearward direction of the vehicle with respect to a center of the upper main body.

The upper body pillar unit may include pillar unit connection members configured to connect two opposite sides of the upper body pillar unit bent and protruding toward an upper side of the vehicle.

The pillar unit connection member may be bent in a forward/rearward direction of the vehicle so as to be coupled to an interior material or an exterior material.

The upper body may further include interior material brackets coupled to the upper main body or the upper body pillar unit and connected to an interior material of the vehicle.

The upper main body, the upper body pillar unit, and the upper body connection member may be each provided in the form of a pipe having an opened cross-section opened at one side thereof.

The upper main body, the upper body pillar unit, and the upper body connection member, which are configured by the pipes, may be coupled to one another by bolting or riveting.

The upper body may further include upper body reinforcing members configured to connect the upper body pillar units and the upper main body and extending in a direction intersecting the upper body pillar unit.

The upper body connection member may include an upper body auxiliary member configured to connect the plurality of upper body pillar units disposed at a middle side.

The upper body connection member may be provided in plural, and the plurality of upper body connection members may connect two opposite sides of the upper body pillar unit based on a transverse direction.

The upper body for a vehicle according to embodiments of the present invention may be configured by the plurality of pipes, and the plurality of pipes is fastened by bolting or riveting, which reduces costs. In addition, the upper body for a vehicle is designed to be easily assembled or disassembled, such that maintenance may be easily performed and the component of the upper body may be easily replaced with another component when the upper body is damaged.

In addition, since the plurality of upper body pillar units is disposed and coupled to the upper side of the upper main body configured to define the floor of the upper body, the freight loading space may be variously formed in the vehicle. Therefore, the upper body may be applied to various vehicles suitable for the customer's requirements, which makes it possible to simplify design and reduce manufacturing costs.

DETAILED DESCRIPTION OF ILLUSTRATIVE EMBODIMENTS

Figure 1:
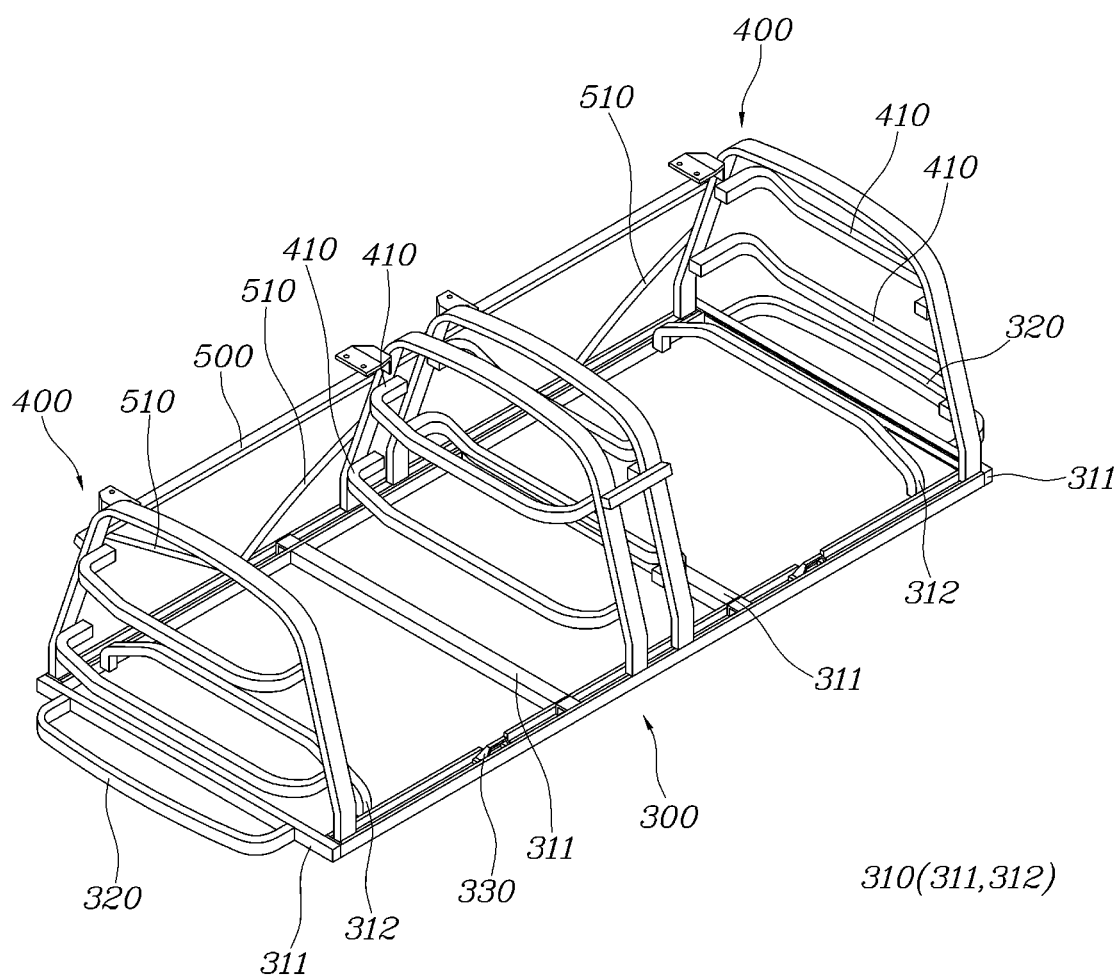
FIG. 1 is a perspective view of an upper body for a vehicle according to an embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, such as, "between" and "just between" or "adjacent to" and "directly adjacent to", for explaining a relationship between constituent elements, should be interpreted in a similar manner.

The terms used in the present specification are used to just describe specific embodiments and are not intended to limit the present invention. Singular expressions include plural expressions unless clearly described as having different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as having ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

In the related art, a process of manufacturing a vehicle is performed for a comparatively long period of time and a large amount of manufacturing cost is required to provide the vehicle with a suspension for a vehicle, exterior components, interior components, a steering system, a safety device, and the like in consideration of convenience for passengers getting into the vehicle, ride quality for the passengers, safety specifications, external appearances, traveling performance, and the like. In addition, because separate vehicles suitable for various applications need to be manufactured, there is a problem in that it is impossible to easily manufacture customized vehicles suitable for all applications.

The vehicle, to which the technology according to embodiments of the present invention may be applied, is a business vehicle, such as a purpose-built vehicle (PBV), used for various commercial purposes such as product distribution, food trucks, delivery, and service provision. In the case of the illustrated representative embodiments, passengers are not seated in the vehicle, but only freight is loaded into an internal space of the vehicle. Further, the vehicle is driven by an autonomous driving system and used for unmanned delivery of freight or food, product distribution, and product delivery.

The vehicle according to embodiments of the present invention has a simplified structure, such that a process of designing and manufacturing the vehicle may be simplified. An advantage of the vehicle is that components of the vehicle may be modularized, such that costs may be reduced, a supply of components may be easily performed, and the vehicle may be completely manufactured by mechanically coupling the modularized components of the vehicle by bolting, riveting, or the like through production processes in an environmentally friendly smart factory without a pressing process, a vehicle body welding process, and a painting process.

The vehicle, to which embodiments of the present invention is applied, may be divided into a business region positioned at an upper side and configured to allow freight to be loaded thereon, and a drive region positioned at a lower side and configured to drive the vehicle. The business region may be variously changed depending on a customer's requirements, and the drive region may be variously changed depending on driving conditions of the vehicle.

The vehicle according to the illustrated embodiments is basically designed to have a structure in which a door is opened only at one side and a space in which freight may be loaded is opened. The business region may be designed to have various shapes depending on the customer's requirements.

The upper body for a vehicle according to embodiments of the present invention constitutes the vehicle body positioned in the business region of the vehicle for an unmanned delivery system.

Figure 9:
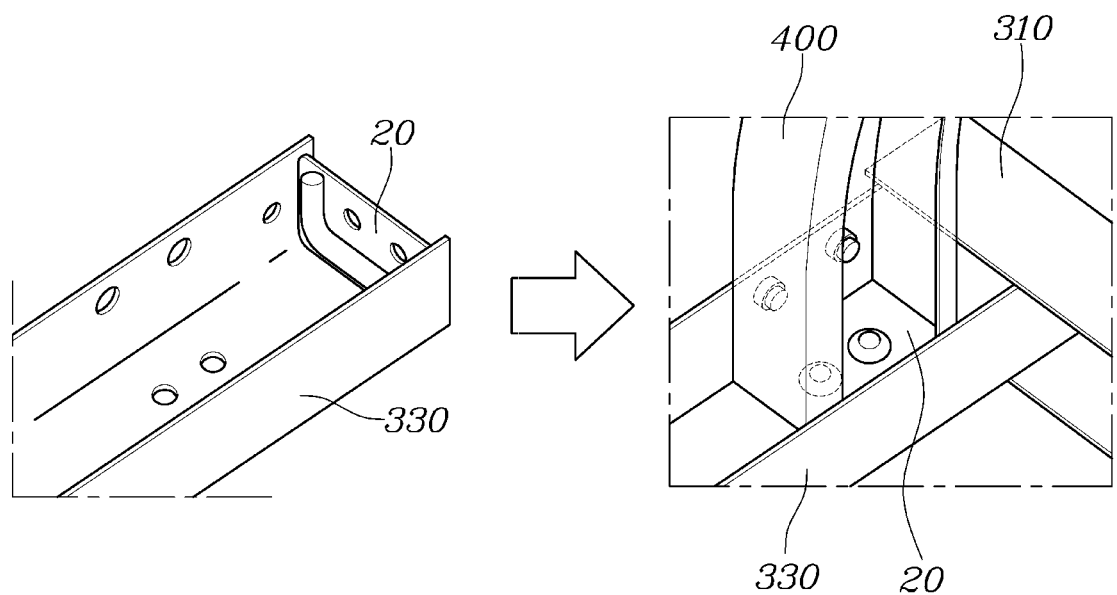
FIG. 9 is a perspective view illustrating a state in which an upper body pillar unit and an upper body transverse member are coupled to an upper body longitudinal member of the upper body for a vehicle according to an embodiment of the present invention.

FIG. 9 is a perspective view illustrating a state in which upper body pillar units 400 and upper body transverse members 310 are coupled to upper body longitudinal members 330 of an upper body for a vehicle according to an embodiment of the present invention.

Figure 8:
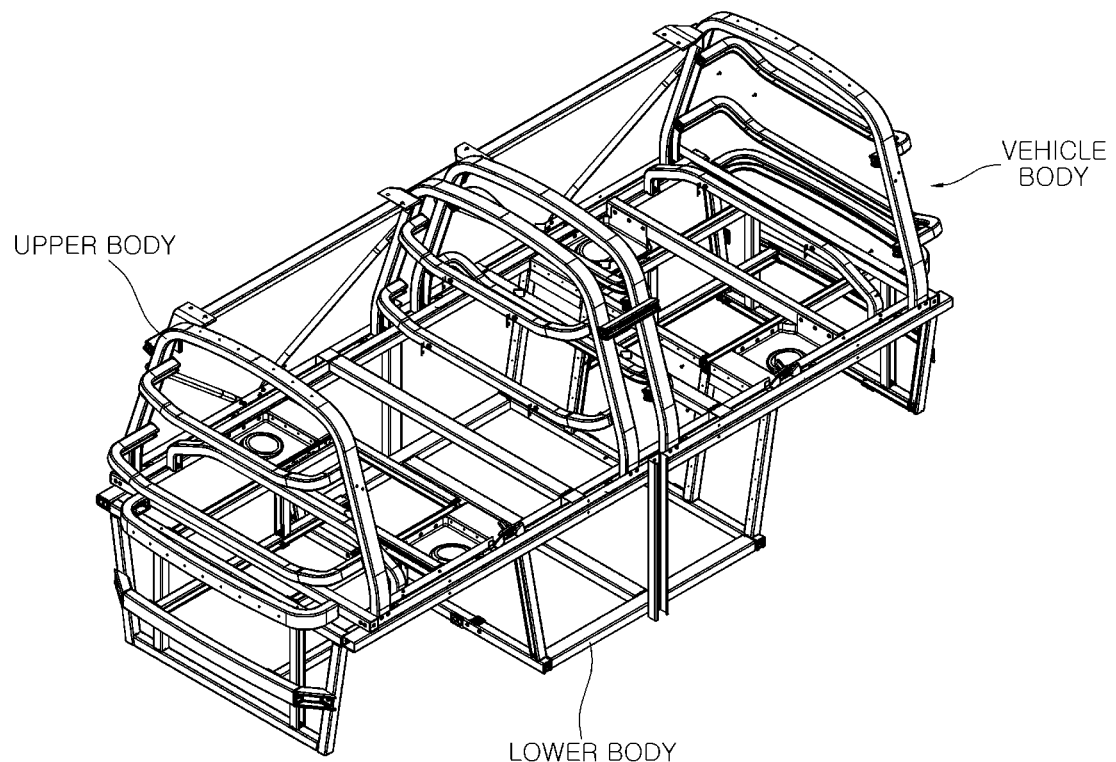
FIG. 8 is a perspective view illustrating a vehicle body of a vehicle according to an embodiment of the present invention.

Referring to FIG. 8, the upper body and a lower body are assembled by assembling a plurality of pipe members by bolting, such that the vehicle may be easily manufactured, repaired, and rebuilt. A lower portion of the upper body constitutes a floor. A drive motor, wheels, suspension systems, a battery, and the like may be mounted at front and rear sides of the lower body. In addition, an additional battery may be mounted at a center of the lower body, or a freight space may be defined at the center of the lower body. Further, the upper body and the lower body are separately assembled and then fastened to each other in an upward/downward direction, thereby constituting a vehicle body of the completely manufactured vehicle. Therefore, various combinations of upper and lower bodies may be assembled.

Figure 2:
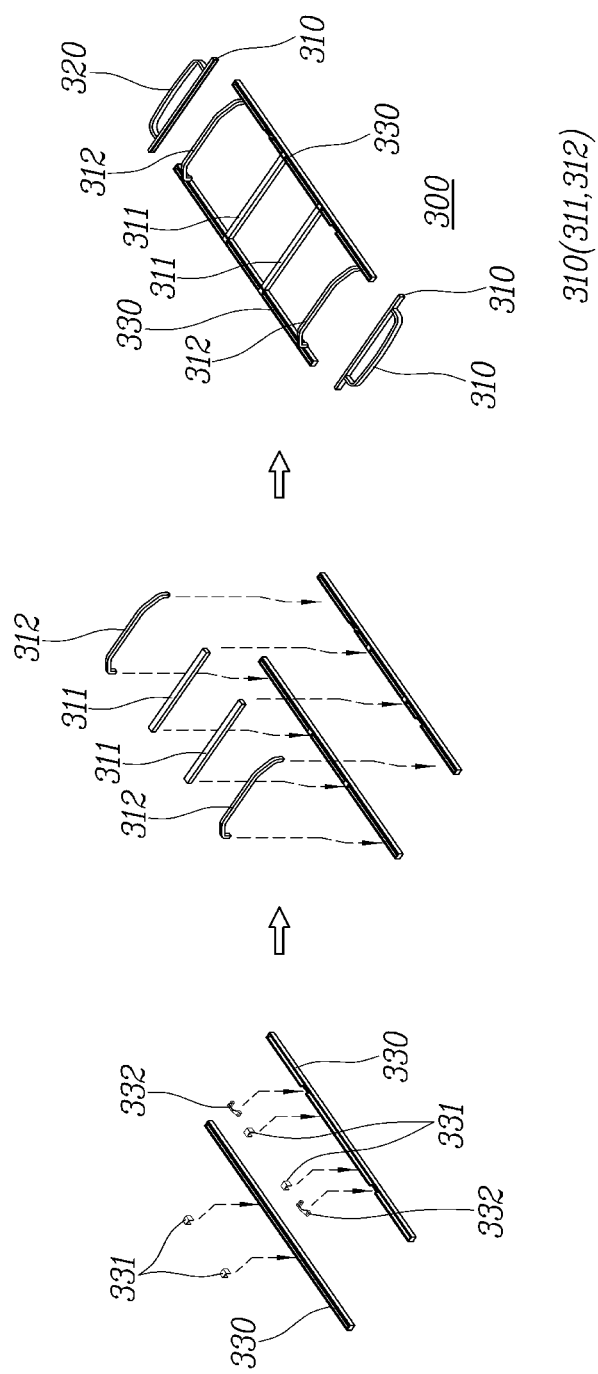
FIG. 2 is a perspective view illustrating a process of assembling an upper main body included in the upper body for a vehicle according to an embodiment of the present invention.
Figure 3:
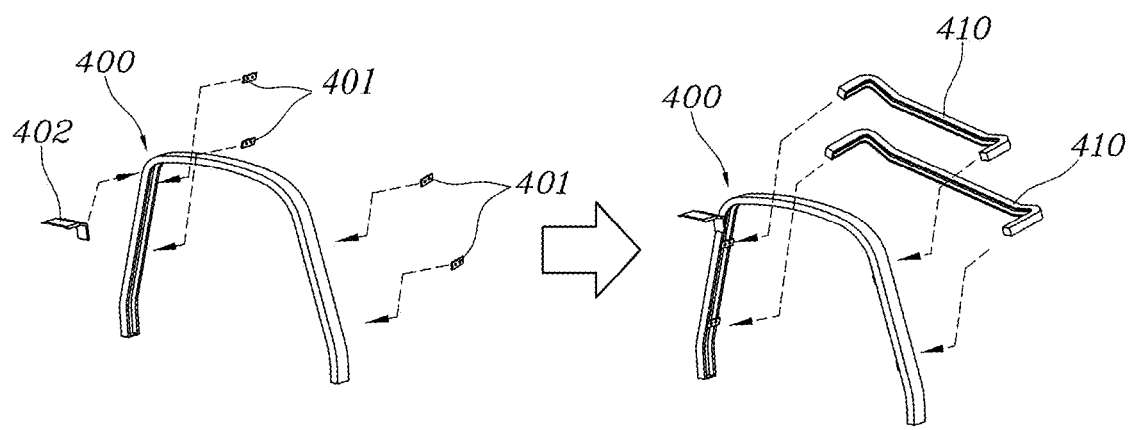
FIG. 3 is a perspective view illustrating a process of assembling an upper body pillar unit included in the upper body for a vehicle according to an embodiment of the present invention.
Figure 4:
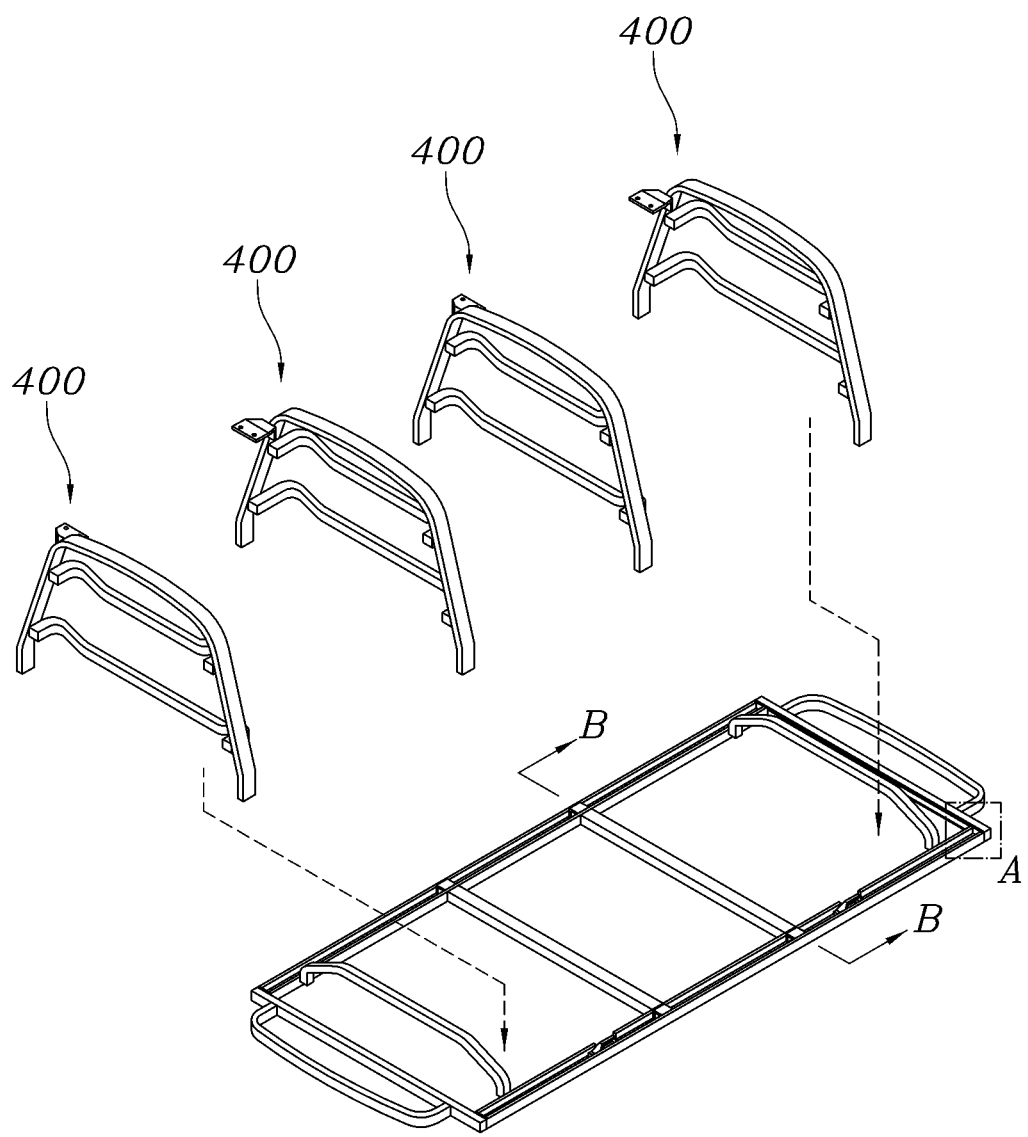
FIGS. 4 and 5 are perspective views illustrating a process of assembling the upper body for a vehicle according to an embodiment of the present invention.
Figure 5:
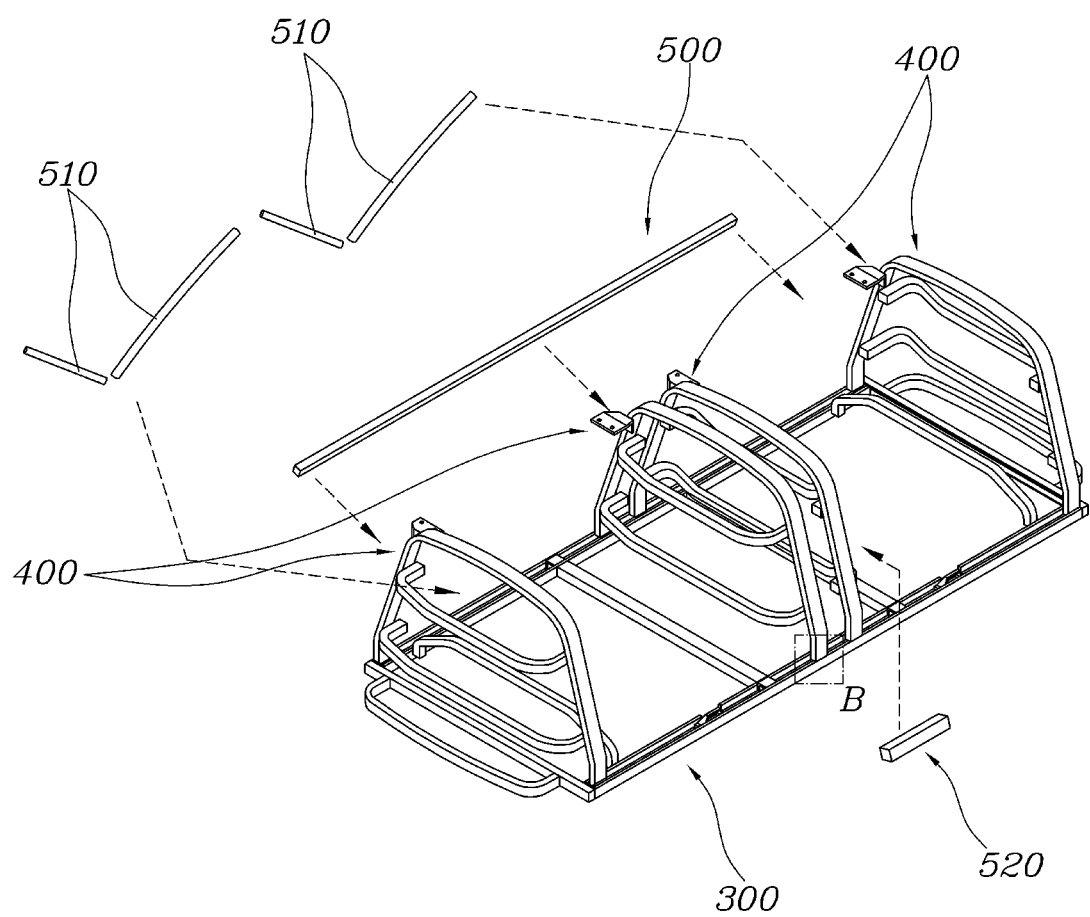
Figure 6:
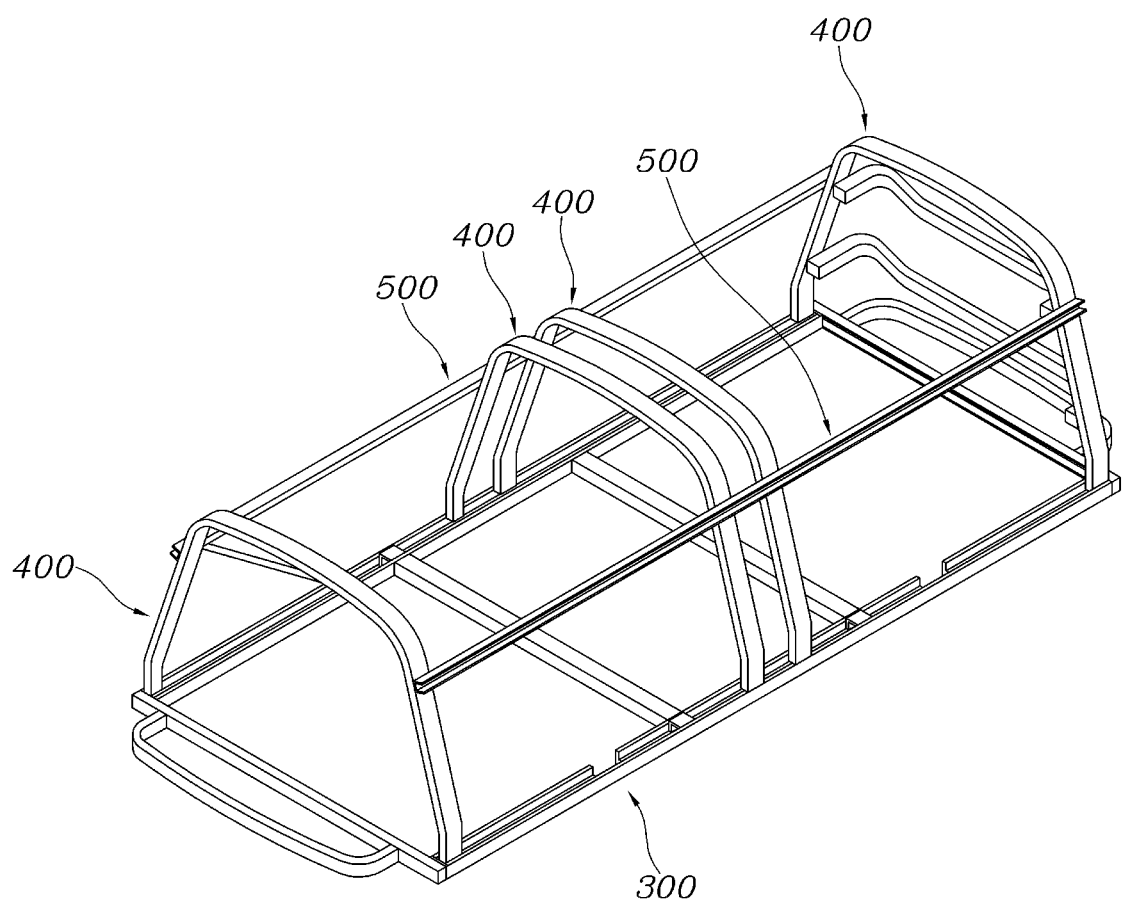
FIG. 6 is a perspective view of the upper body for a vehicle according to another embodiment of the present invention.

FIG. 1 is a perspective view of an upper body for a vehicle according to an embodiment of the present invention, FIG. 2 is a perspective view illustrating a process of assembling an upper main body 300 included in the upper body for a vehicle according to an embodiment of the present invention, FIG. 3 is a perspective view illustrating a process of assembling the upper body pillar unit 400 included in the upper body for a vehicle according to an embodiment of the present invention, FIGS. 4 and 5 are perspective views illustrating a process of assembling the upper body for a vehicle according to an embodiment of the present invention, and FIG. 6 is a perspective view of the upper body for a vehicle according to another embodiment of the present invention.

An exemplary embodiment of the upper body for a vehicle will be described with reference to FIGS. 1 to 6.

The upper body for a vehicle according to embodiments of the present invention is an upper body for a vehicle configured by a plurality of pipes and having a lower portion to which a lower body is assembled. The upper body includes an upper main body 300 extending in a longitudinal direction from two opposite sides of the vehicle, having a plurality of transverse members, and having a lower portion to which the lower body is coupled, a plurality of upper body pillar units 40*o* each having a central portion bent and protruding upward, having two opposite ends respectively connected to two opposite sides of the upper main body 300, and disposed to be spaced apart from one another in the longitudinal direction, and an upper body connection member 500 extending in the longitudinal direction of the vehicle, spaced apart upward from a side of the upper main body 300, and configured to connect sides of the plurality of upper body pillar units 400.

The upper main body 300 extends in the longitudinal direction of the vehicle and is disposed at a lower side of the upper body for a vehicle. A lower side of the upper main body 300 may be coupled to the lower body for a vehicle. Since the upper main body 300 is positioned at the lower side of the upper body for a vehicle, a space in which freight is to be loaded may be provided at an upper side of the upper main body 300.

Since the upper main body 300 is configured by the plurality of pipes, the upper main body 300 may be easily coupled to the lower body configured by the plurality of pipes by bolting or riveting.

That is, the upper main body 300 may be easily separated from or coupled to the lower body for a vehicle by bolting or riveting without the necessity of a pressing process or a welding process, and the upper body for a vehicle may also be easily modified and repaired.

The upper body pillar unit 400 is disposed on an upper portion of the upper main body 300. The upper body pillar unit 400 is configured by the pipe and has an arcuate shape having a central portion bent and protruding upward. The two opposite ends of the upper body pillar unit 400 may be connected to the two opposite sides of the upper main body 300 based on the longitudinal direction of the vehicle.

In this case, the upper body pillar unit 400 may also be coupled to the upper main body 300 by bolting or riveting. Therefore, the upper body pillar unit 400 may be easily coupled or decoupled, such that the upper body pillar unit 400 may be easily modified or repaired.

Basically, the upper body pillar units 400 are disposed at the front and rear sides of the vehicle to constitute all pillars of the vehicle. One or more upper body pillar units 400 may be disposed at positions spaced apart from each other between the front and rear sides according to a customer's requirements.

The vehicle illustrated in embodiments of the present invention has a basic model having two loading spaces for freight. Two upper body pillar units 400 are disposed at the front and rear sides, and two upper body pillar units 400 are disposed at a middle region, such that the two loading spaces for freight may be formed. The upper body pillar units 400 may be disposed at various positions.

The upper body connection member 500 may extend in the longitudinal direction of the vehicle and connect the plurality of upper body pillar units 400 disposed at the upper side of the upper main body 300, thereby improving coupling rigidity of the upper body pillar units 400.

Figure 13:
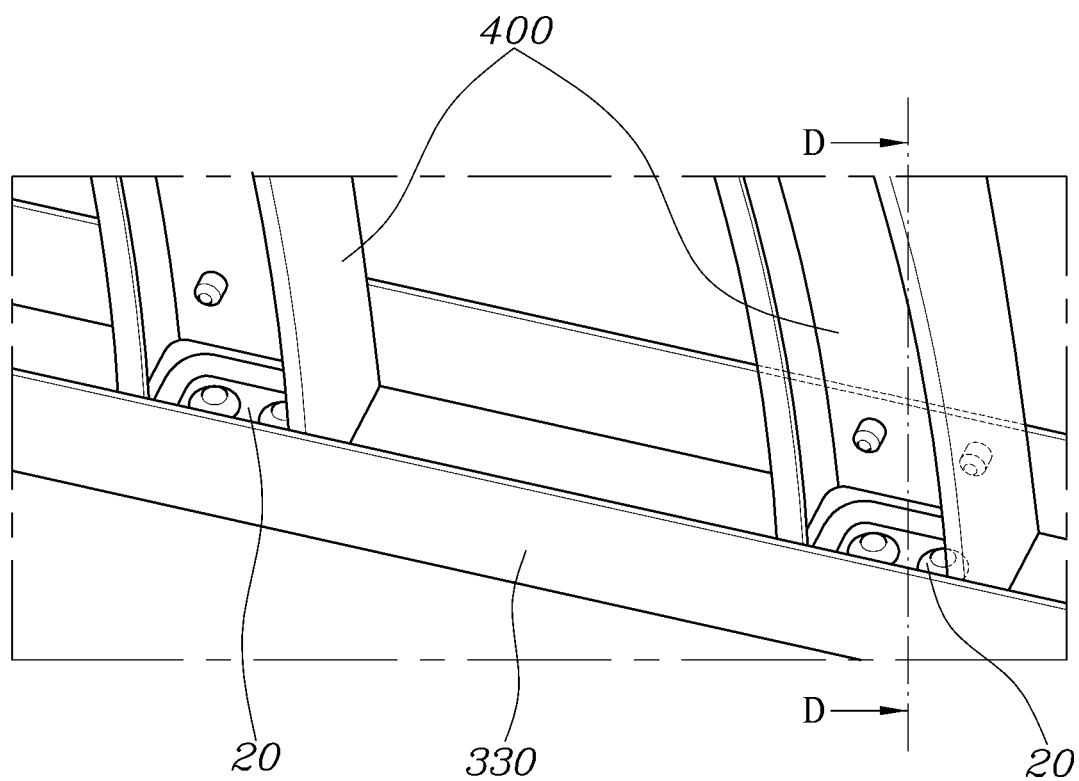
FIG. 13 is an enlarged perspective view of part B in FIG. 5.
Figure 14:
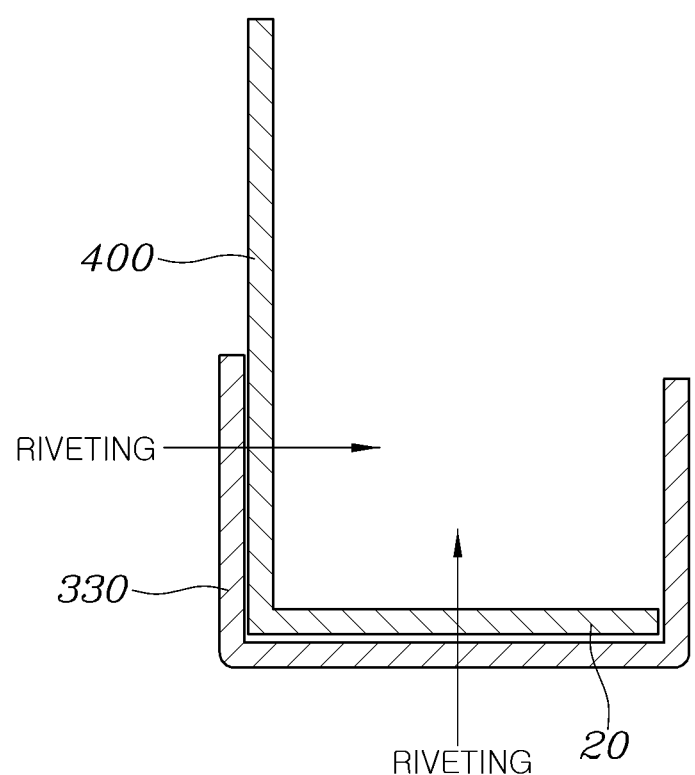
FIG. 14 is a cross-sectional view taken along line D-D in FIG. 13.

FIG. 9 is a perspective view illustrating a state in which the upper body pillar unit and the upper body transverse member are coupled to the upper body longitudinal member of the upper body for a vehicle according to an embodiment of the present invention, FIG. 13 is an enlarged perspective view of part B in FIG. 5, and FIG. 14 is a cross-sectional view taken along line D-D in FIG. 13.

Referring to FIGS. 9, 13, and 14, an end patch 20 may be coupled to an end of the upper body pillar unit 400. A hole is formed to penetrate the upper body longitudinal member 330, such that the upper body pillar unit 400 and the upper body longitudinal member 330 may be fastened to each other by bolting or riveting.

The upper body connection member 500 and the upper body pillar unit 400 may be coupled to each other by bolting or riveting. Therefore, the upper body connection member 500 may be easily coupled or decoupled, and the upper body connection member 500 may be easily replaced at the time of changing a business model according to the customer's requirements.

The upper main body 300 may include the pair of upper body longitudinal members 330 extending in the longitudinal direction and the plurality of upper body transverse members 310 configured to connect the pair of upper body longitudinal members 330 in the transverse direction and spaced apart from one another in the longitudinal direction.

As illustrated in FIG. 2, the upper main body 300 may include the upper body longitudinal members 330 extending in the longitudinal direction and disposed at a side portion of the upper main body 300 and the upper body transverse members 310 configured to connect the upper body longitudinal members 330 and extending in a direction intersecting the upper body longitudinal members 330.

Therefore, a lower framework may be provided, and the loading space may be defined at the upper side of the upper main body 300.

Figure 10:
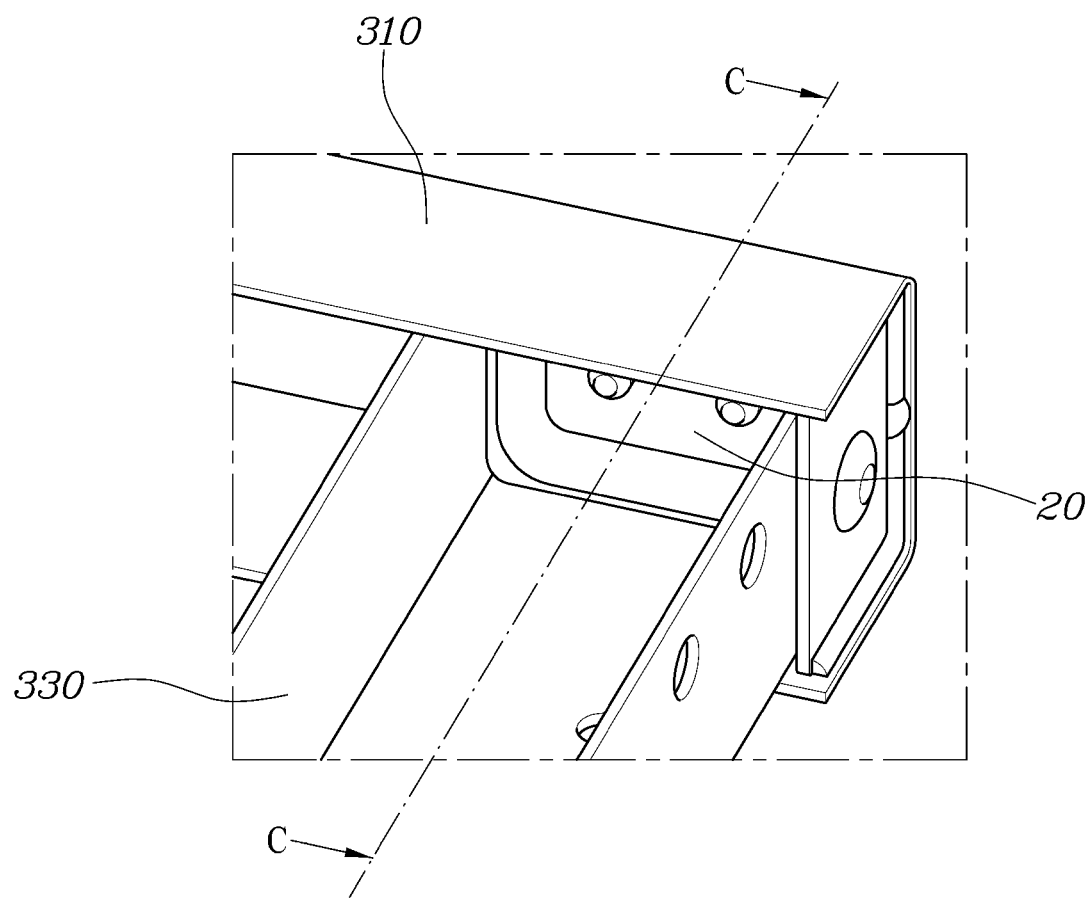
FIG. 10 is an enlarged perspective view of part A in FIG. 4.
Figure 11:
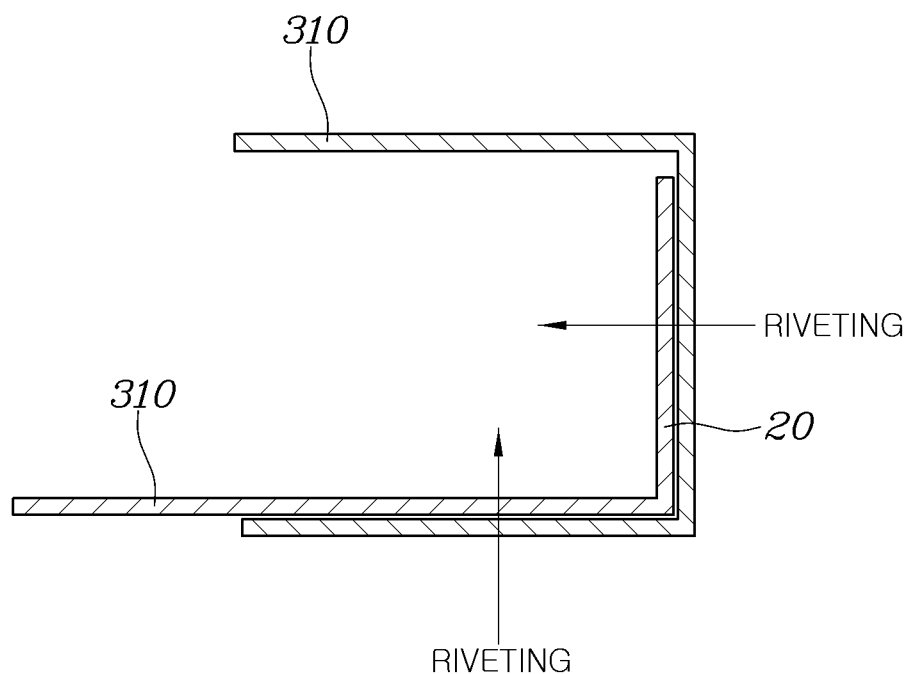
FIG. 11 is a cross-sectional view taken along line C-C in FIG. 10.

FIG. 10 is an enlarged perspective view of part A in FIG. 4, and FIG. 11 is a cross-sectional view taken along line C-C in FIG. 10.

As illustrated in FIGS. 9 to 11, the end patch 20 may be coupled to the end of the upper body longitudinal member 330, and the end patch 20 and the upper body transverse member 310 may be coupled to each other by bolting or riveting.

In addition, the lower body may be coupled to the lower side of the upper main body 300. In this case, the upper main body 300 and the lower body may be coupled to each other by bolting or riveting. Therefore, the upper main body 300 and the lower body may be easily coupled or decoupled, such that the maintenance and replacement may be easily performed.

The upper main body 300 may further include upper body brackets 331 coupled to the upper body longitudinal members 330 and configured to connect the upper body longitudinal members 330 and the upper body transverse members 310.

As illustrated in FIG. 2, the upper body longitudinal members 330 may be coupled to the upper body transverse members 310, and the upper body brackets 331 may be coupled to the upper body longitudinal members 330 to couple the upper body longitudinal members 330 and the upper body transverse members 310.

Figure 12:
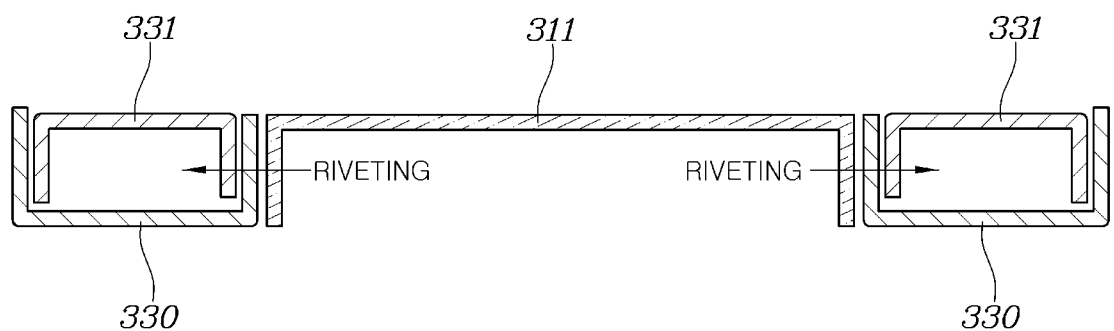
FIG. 12 is a cross-sectional view taken along line B-B in FIG. 4.

FIG. 12 is a cross-sectional view taken along line B-B in FIG. 4.

In addition, referring further to FIG. 12, the upper body longitudinal member 330 has a pipe shape opened at an upper side thereof, the upper body bracket 331 is coupled to cover a part of the upper side of the upper body longitudinal member 330, and the upper body transverse member 310, together with the upper body bracket 331, may be coupled to the upper body longitudinal member 330.

Therefore, it is possible to improve rigidity of the portion where the upper body bracket 331 is coupled to the upper body longitudinal member 330 and the upper body transverse member 310.

The upper body transverse member 310 may be bent and extend so as to be coupled to an interior material or an exterior material of the vehicle.

As illustrated in FIG. 2, the upper body transverse member 310 may extend in a straight shape 311 and have a shape 312 bent upward, such that the upper body transverse member 310 is coupled to the interior material of the vehicle.

In addition, the upper body transverse member 310 having the shape 312 bent upward may absorb a lateral impact force in the event of a broadside collision of the vehicle, thereby more safely protecting freight loaded in the vehicle.

The upper main body 300 may further include upper body bent members 320 each coupled to an outer side of the upper body transverse member 310 positioned at the front or rear side of the vehicle and bent and protruding outward so as to be coupled to the exterior material of the vehicle.

As illustrated in FIGS. 1 and 2, the upper body transverse members 310 may be positioned at the front and rear sides of the vehicle. The upper body bent members 320 may be coupled to the upper body transverse members 310 positioned at the front and rear sides. The upper body bent members 320 may have a middle portion bent and protruding outward and be coupled to the exterior material. The upper body bent members 320 may absorb impact in the event of a collision of the outer side of the vehicle, thereby protecting the freight in the vehicle.

The upper body pillar units 400 may be disposed to be symmetric in the forward/rearward direction of the vehicle with respect to the center of the upper main body 300.

As illustrated in FIG. 4, the upper body pillar units 400 according to embodiments of the present invention are disposed to be symmetric in the forward/rearward direction of the vehicle with respect to the center of the vehicle to define the loading space in the vehicle. Therefore, the loading space, in which the freight may be loaded, may be provided between the upper body pillar units 400 disposed at the front and rear sides.

As illustrated in FIG. 9, the upper body pillar unit 400 may be fastened to the upper main body 300 by bolting. A spacing distance in the longitudinal direction between the upper body pillar units 400 may be changed depending on a size of the loading space for freight. Since the upper body pillar unit 400 is fastened to the upper main body 300 by bolting, the upper body pillar unit 400 may be easily replaced or removed according to the customer's requirements.

The upper body pillar unit 400 may include pillar unit connection members 410 configured to connect two opposite sides of the upper body pillar unit 400 bent and protruding toward an upper side of the vehicle.

As illustrated in FIG. 3, the upper body pillar unit 400 has an arcuate shape bent and protruding upward. The pillar unit connection members 410 may be further provided to connect the two opposite ends of the arcuate shape. The pillar unit connection member 410 may connect the two opposite sides of the upper body pillar unit 400, thereby improving rigidity of the upper body pillar unit 400.

In addition, the upper body pillar unit 400 may further include pillar unit brackets 401 to fasten the pillar unit connection member 410 to the upper body pillar unit 400. Therefore, the upper body pillar unit 400 and the pillar unit connection member 410 may be easily coupled by bolting or riveting, such that the pillar unit connection member 410 may be easily inspected or replaced.

The pillar unit connection member 410 may be bent in the forward/rearward direction of the vehicle so as to be coupled to the interior material or the exterior material.

As illustrated in FIG. 4, the pillar unit connection member 410 may have an arcuate shape bent and protruding in the forward/rearward direction of the vehicle and disposed such that a protruding direction of the pillar unit connection member 410 is symmetric in the forward/rearward direction of the vehicle with respect to the center of the vehicle.

Therefore, the pillar unit connection member 410 protruding toward the inside of the vehicle may be coupled to the interior material of the vehicle, and the pillar unit connection member 410 protruding toward the outside of the vehicle may be coupled to the exterior material of the vehicle.

Therefore, the upper body pillar units 400 may be easily coupled to the interior material and the exterior material of the vehicle.

In addition, the pillar unit connection member 410 protruding toward the outside of the vehicle may absorb impact in the event of a forward/rearward collision of the vehicle, thereby protecting the freight loaded in the vehicle.

The upper body may further include interior material brackets 332 and 402 coupled to the upper main body 300 or the upper body pillar unit 400 and connected to the interior material of the vehicle.

As illustrated in FIGS. 2 and 3, the interior material of the vehicle may be coupled to the upper main body 300 or the upper body pillar unit 400. In the embodiments of the present invention, a cabinet may be disposed between the upper body pillar units 400 and formed to be opened at one side thereof. To couple the cabinet, the interior material brackets 332 and 402 may be coupled to the upper main body 300 or the upper body pillar unit 400 so as to be easily coupled to the interior material.

The upper main body 300, the upper body pillar unit 400, and the upper body connection member 500 may each be provided in the form of a pipe having an opened cross-section opened at one side thereof. The upper main body 300, the upper body pillar unit 400, and the upper body connection member 500, which are each provided in the form of a pipe having an opened cross-section, may be coupled to one another by bolting or riveting.

As illustrated in FIGS. 1 to 3, the upper main body 300, the upper body pillar unit 400, and the upper body connection member 500 are each provided in the form of a pipe having an opened cross-section and assembled and fastened by bolting or riveting.

Since the upper main body 300, the upper body pillar unit 400, and the upper body connection member 500 are each provided in the form of a pipe having an opened cross-section, an empty vehicle weight may be reduced.

In addition, the respective parts are individually modularized and manufactured in a production factory. As illustrated in FIG. 2, the modularized parts may be completely manufactured by a simple mechanical coupling method such as bolting or riveting in the smart factory.

Therefore, the vehicle may be completely manufactured by coupling all the modularized parts in the smart factory, and the vehicle may be simply remodeled according to the customer's requirements.

The upper body may further include upper body reinforcing members 510 configured to connect the upper body pillar units 400 and the upper main body 300 and extending in a direction intersecting the upper body pillar unit 400.

As illustrated in FIG. 5, the upper body reinforcing members 510, which extend in the direction intersecting the upper body pillar unit 400, may have two opposite ends that connect the upper body pillar unit 400 and the upper main body 300, thereby improving the rigidity of the upper body pillar units 400.

In an embodiment of the present invention, the upper body reinforcing members 510 connect the upper body pillar units 400 and the upper main body 300 only at one side. However, the upper body reinforcing members 510 may be connected at two opposite sides of the upper body pillar units 400 and the upper main body 300 according to various types of vehicles.

The upper body connection member 500 may include an upper body auxiliary member 520 configured to connect the plurality of upper body pillar units 400 disposed at the middle region.

According to an embodiment of the present invention, the four upper body pillar units 400 may be connected to the upper side of the upper main body 300. The two upper body pillar units 400 are coupled to the front and rear sides of the upper main body 300, and the remaining two upper body pillar units 400 are disposed between the front and rear sides of the upper main body 300, such that the four upper body pillar units 400 are symmetric in the forward/rearward direction with respect to the center of the upper main body 300.

As illustrated in FIG. 5, the upper body auxiliary member 520 may be disposed to connect the sides of the two upper body pillar units 400 disposed at the center of the upper main body 300. The upper body pillar unit 400 is formed to be opened at one side thereof, such that the lateral side of the upper body pillar unit 400 according to an embodiment of the present invention may be opened.

The upper body auxiliary member 520 with the above-mentioned shape may improve the rigidity of the upper body pillar unit 400.

The upper body connection member 500 may be provided in plural, and the plurality of upper body connection members 500 may connect the two opposite sides of the upper body pillar units 400 based on the transverse direction.

As illustrated in FIG. 6, as another embodiment of the present invention, a vehicle used to transport freight according to the customer's requirements may have an open space formed at an upper side or a front side thereof, thereby further improving the rigidity of the vehicle.

Therefore, the pair of upper body connection members 500 for a vehicle may be provided and coupled to the two opposite sides of the sides of the upper body pillar units 400, thereby improving the rigidity of the vehicle.

The end of the upper main body 300, the upper body pillar unit 400, or the upper body connection member 500, which is configured by the plurality of pipes, is opened, and the upper body may further include the end patch 20 configured to connect the plurality of pipes. The end patch is coupled by welding in a state of being spaced apart inward from the end of the upper main body 300, the upper body pillar unit 400, or the upper body connection member 500, and a bead produced by welding may be positioned in a separation space formed as the end patch 20 is spaced apart inward from the upper main body 300, the upper body pillar unit 400, or the upper body connection member 500.

Figure 7:
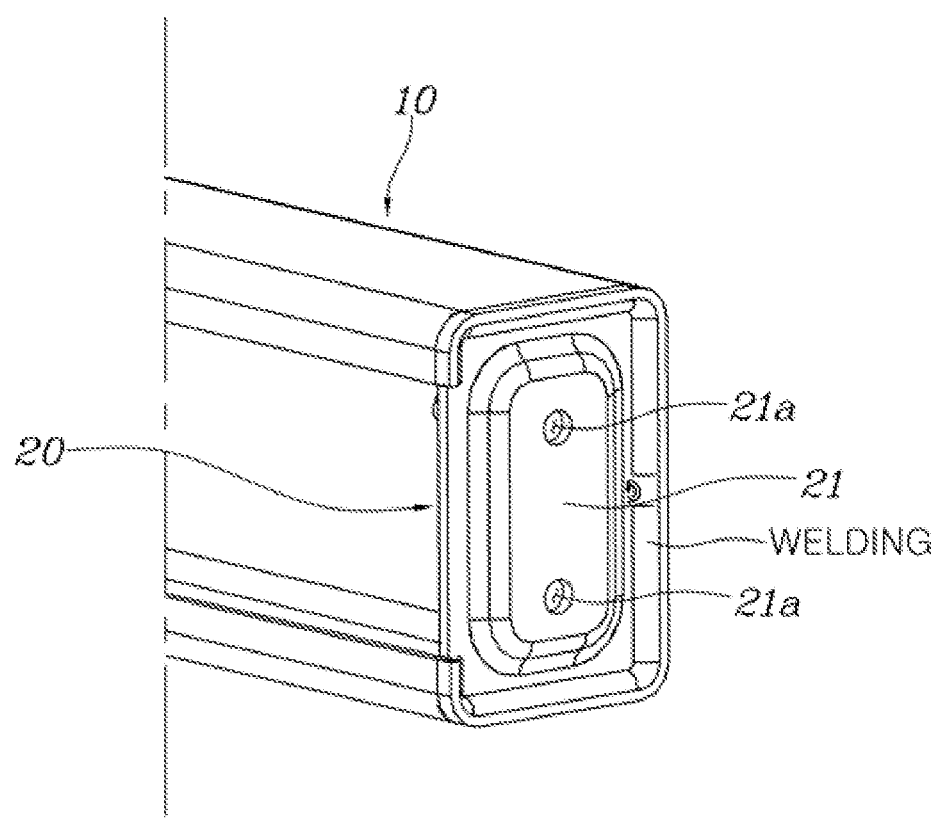
FIG. 7 is a perspective view illustrating a state in which an end patch is coupled to a pipe of the upper main body according to an embodiment of the present invention.

FIG. 7 is a perspective view illustrating a state in which the end patch 20 is coupled to the pipe 10 of the upper main body 300 according to an embodiment of the present invention.

As illustrated in FIG. 7, the end patch 20 may be coupled to the end of the pipe 10 of the upper main body 300. In addition, although not illustrated in the drawings, the end patch 20 may also be coupled to the end of the upper body pillar unit 400 or the upper body connection member 500, such that the pipes may be simply fastened to each other by bolting or riveting at the time of assembling the lower body for a vehicle.

In addition, the vehicle body according to embodiments of the present invention may have a truss structure configured by the pipes, and the end patches may be coupled to the ends of all the pipes included in embodiments of the present invention.

In addition, the end patch 20 is coupled by welding in a state of being spaced apart inward from the end of the upper main body 300, the upper body pillar unit 400, or the upper body connection member 500, and the welding bead is positioned in the separation space. Therefore, it is not necessary to perform a process of removing the welding bead, and the manufacturing work may be simplified in comparison with the manufacturing process in the related art in which an end of a pipe is bent and welded and a welding bead is removed after the welding.

In addition, a coupling part 21 formed on the end patch 20 protrudes further than the end of the pipe and is coupled to another pipe, such that it is possible to minimize vibration or noise occurring on a coupling portion.

Through-holes 21a are formed to penetrate the coupling part 21, such that the pipes may be coupled by mechanical coupling including bolting or riveting. Therefore, the vehicle body may be completely manufactured by simply coupling the plurality of pipes in the smart factory, the manufacturing costs may be reduced, and the manufacturing process may be simplified.

While the specific embodiments of the present invention have been illustrated and described above, it will be obvious to those skilled in the art that the present invention may be variously modified and changed without departing from the technical spirit of the present invention defined in the appended claims.

What is claimed is:

1. An upper body for a vehicle, the upper body comprising:
   an upper main body extending in a longitudinal direction from two opposite sides of the vehicle, the upper main body comprising a plurality of transverse members;
   a plurality of upper body pillar units each comprising a central portion bent and protruding upward and two opposite ends respectively connected to two opposite sides of the upper main body, the plurality of upper body pillar units being disposed to be spaced apart from one another in the longitudinal direction; and
   an upper body connection member extending in the longitudinal direction of the vehicle, spaced apart upward from a side of the upper main body, and connecting sides of the plurality of upper body pillar units, wherein each of the upper body pillar units comprises pillar unit connection members connecting two opposite sides of the upper body pillar unit by being bent and protruding toward a front or rear side of the vehicle.

2. The upper body of claim 1, wherein the upper main body comprises:
   a pair of upper body longitudinal members extending in the longitudinal direction; and
   a plurality of upper body transverse members configured to connect the pair of upper body longitudinal members in a transverse direction and spaced apart from one another in the longitudinal direction.

3. The upper body of claim 2, wherein the upper main body further comprises upper body brackets coupled to the upper body longitudinal members and connecting the upper body longitudinal members and the upper body transverse members.

4. The upper body of claim 2, wherein the upper body transverse members are bent and extend so as to be coupled to an interior material or an exterior material of the vehicle.

5. The upper body of claim 2, wherein the upper main body further comprises upper body bent members each coupled to an outer side of the upper body transverse member positioned at the front or rear side of the vehicle and bent and protruding outward so as to be coupled to an exterior material of the vehicle.

6. The upper body of claim 1, wherein the upper body pillar units are disposed to be symmetric in a forward/rearward direction of the vehicle with respect to a center of the upper main body.

7. The upper body of claim 1, wherein each of the pillar unit connection members is bent in a forward/rearward direction of the vehicle so as to be coupled to an interior material or an exterior material of the vehicle.

8. The upper body of claim 1, further comprising interior material brackets coupled to the upper main body or the upper body pillar units and connected to an interior material of the vehicle.

9. The upper body of claim 1, wherein the upper main body, the upper body pillar units, and the upper body connection member are each provided in a form of a pipe having an opened cross-section opened at one side thereof.

10. The upper body of claim 9, further comprising bolts or rivets coupling the upper main body, the upper body pillar units, and the upper body connection member to one another.

11. The upper body of claim 1, further comprising upper body reinforcing members connecting the upper body pillar units and the upper main body and extending in a direction intersecting the upper body pillar units.

12. The upper body of claim 1, wherein the upper body connection member comprises an upper body auxiliary member connecting the plurality of upper body pillar units disposed at a middle region.

13. The upper body of claim 1, wherein the upper body connection member further includes a plurality of the upper body connection members, each of the upper body connection members connecting two opposite sides of the upper body pillar units in a longitudinal direction of the upper body.

14. The upper body of claim 1, wherein:
   wherein the upper main body, the upper body pillar units, and the upper body connection member are each provided in a form of a pipe having an opened cross-section opened at an end thereof;

an end patch is coupled to the opened end of the upper main body, the upper body pillar units, or the upper body connection member to close the end and to couple the pipes;

the end patch is coupled by a weld in a state of being spaced apart inward from the end of the upper main body, the upper body pillar units, or the upper body connection member; and a bead produced by the weld is positioned in a separation space defined by the end patch being spaced apart inward from the end of the upper main body, the upper body pillar units, or the upper body connection member.

15. A vehicle comprising:

a lower body; and an upper body having a lower portion coupled to the lower body, the upper body comprising:

an upper main body extending in a longitudinal direction from two opposite sides of the vehicle, the upper main body comprising a plurality of transverse members;

a plurality of upper body pillar units each comprising a central portion bent and protruding upward and two opposite ends respectively connected to two opposite sides of the upper main body, the plurality of upper body pillar units being disposed to be spaced apart from one another in the longitudinal direction; and an upper body connection member extending in the longitudinal direction of the vehicle, spaced apart upward from a side of the upper main body, and connecting sides of the plurality of upper body pillar units wherein each of the upper body pillar units comprises pillar unit connection members connecting two opposite sides of the upper body pillar unit by being bent and protruding toward a front or rear side of the vehicle, each of the pillar unit connection members being bent in a forward/rearward direction of the vehicle so as to be coupled to an interior material or an exterior material of the vehicle.

16. The vehicle of claim 15, wherein the upper main body comprises:

a pair of upper body longitudinal members extending in the longitudinal direction; and a plurality of upper body transverse members configured to connect the pair of upper body longitudinal members in a transverse direction and spaced apart from one another in the longitudinal direction.

17. The vehicle of claim 16, wherein the upper main body further comprises upper body brackets coupled to the upper body longitudinal members and connecting the upper body longitudinal members and the upper body transverse members.

18. The vehicle of claim 16, wherein the upper main body further comprises upper body bent members each coupled to an outer side of the upper body transverse member positioned at the front or rear side of the vehicle and bent and protruding outward so as to be coupled to the exterior material of the vehicle.

* * * * *